United States Patent [19]

Kraps et al.

[11] 4,238,258
[45] Dec. 9, 1980

[54] ELONGATE MATERIAL SPREADING AND TACKING APPARATUS AND METHOD

[75] Inventors: Michael H. Kraps, Edwards; Samuel B. Stevens, Pekin, both of Ill.

[73] Assignee: Caterpillar Tractor Co., Peoria, Ill.

[21] Appl. No.: 89,121

[22] PCT Filed: Jun. 26, 1979

[86] PCT No.: PCT/US79/00449

§ 371 Date: Jun. 26, 1979

§ 102(e) Date: Jun. 26, 1979

[51] Int. Cl.³ .................................... B29H 15/00
[52] U.S. Cl. .................................... 156/120; 81/15.3; 152/430; 156/421
[58] Field of Search ............... 156/69, 110 R, 118, 156/119, 120, 121, 123, 172, 191, 194, 213, 261, 262, 293, 294, 298, 303.1, 383, 394, 397, 421, 423, 513, 514; 152/350, 417, 429, 430, DIG. 7, DIG. 11; 81/15.3, 15.5, 15.7; 254/50.1, 50.4; 269/47

[56] References Cited

U.S. PATENT DOCUMENTS

| | | | |
|---|---|---|---|
| 1,541,119 | 6/1925 | Rusha | 156/118 |
| 2,746,812 | 5/1956 | Eger | 152/341 |
| 3,017,308 | 1/1962 | Pond | 156/120 |
| 3,031,354 | 4/1962 | Williams | 156/293 |
| 3,490,979 | 1/1970 | Calvert et al. | 156/366 |
| 3,606,921 | 9/1971 | Grawey | 152/360 |
| 4,010,052 | 3/1977 | Edwards | 156/120 |
| 4,102,323 | 7/1978 | Pinkham | 156/120 |

Primary Examiner—John E. Kittle
Attorney, Agent, or Firm—Wegner, Stellman, McCord, Wiles & Wood

[57] ABSTRACT

An apparatus and method is provided for heat tacking of elongate material or cables (32) to a tire carcass (15) on both peripheral sides of a core opening (20), spreading the elongate material or cables (32) lying over the core opening (20) so as to position the elongate material or cables (32) on either circumferential side of the core opening (20), and heat tacking the spread elongate material or cables (32) to the tire carcass (15). The apparatus includes a frame (40) having locating pads (72,102) for positioning the heat-tacking and elongate material or cable-spreading subassembly (110) with respect to the core opening (20). The tacking members (120,125,120) are preheated to a tacking temperature so that when the frame (40) is clamped onto the carcass (15), and the elongate material or cables (32) are spread, the spread elongate material or cables (32) are tacked to the carcass. A core plug (25) may act as the elongate material or cable-spreading member and may be optionally removed when the frame (40) is removed from the carcass (15).

19 Claims, 16 Drawing Figures

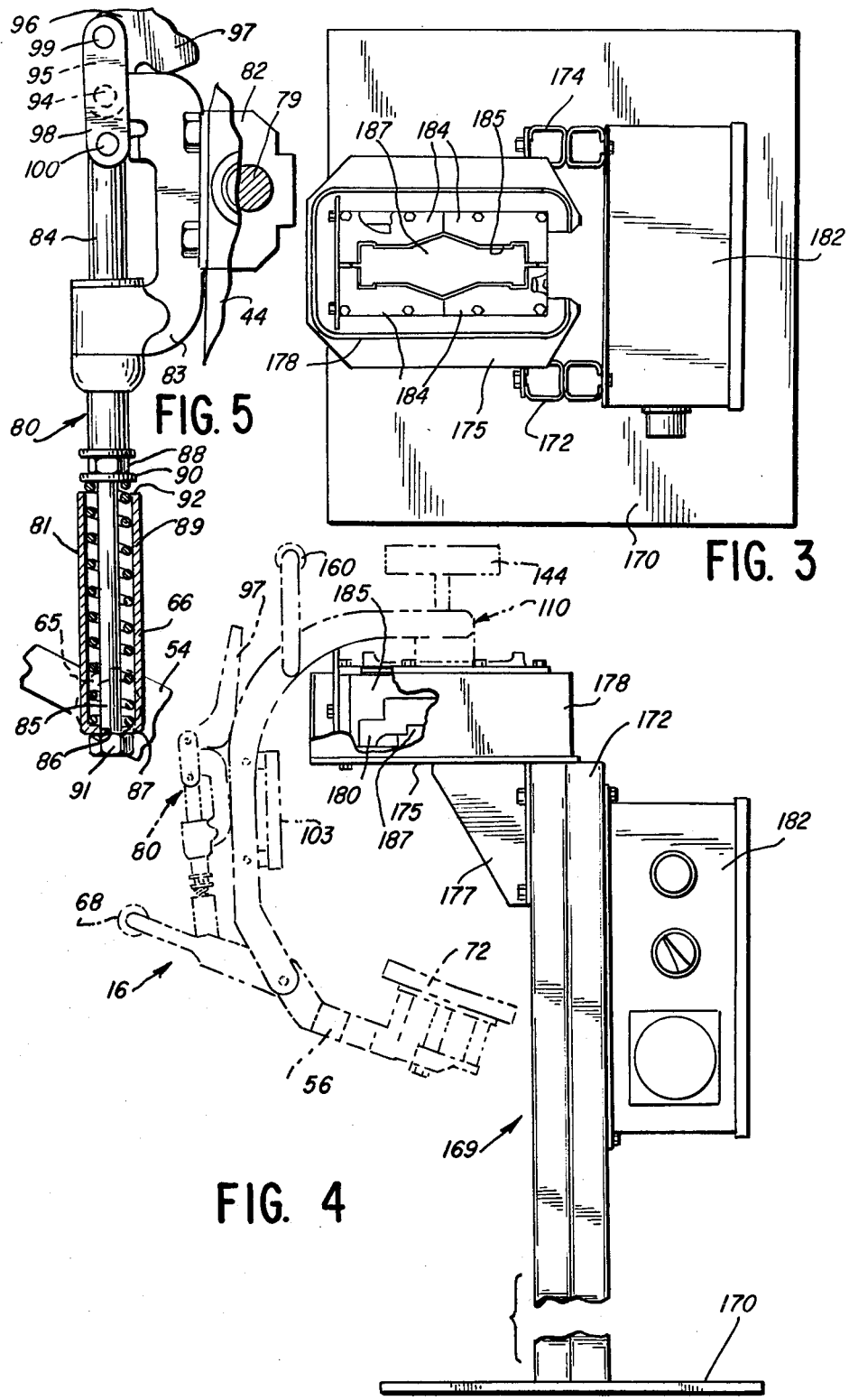

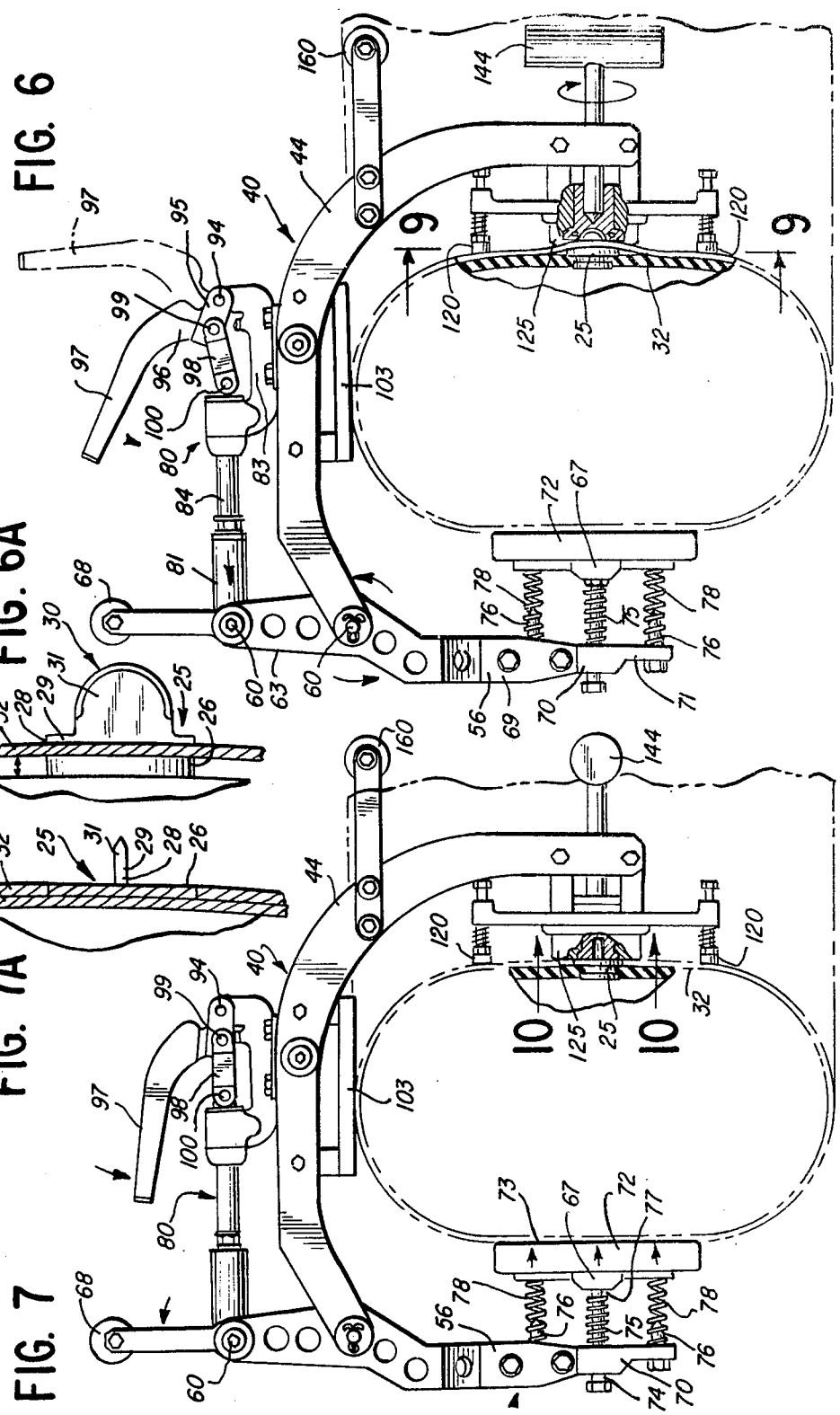

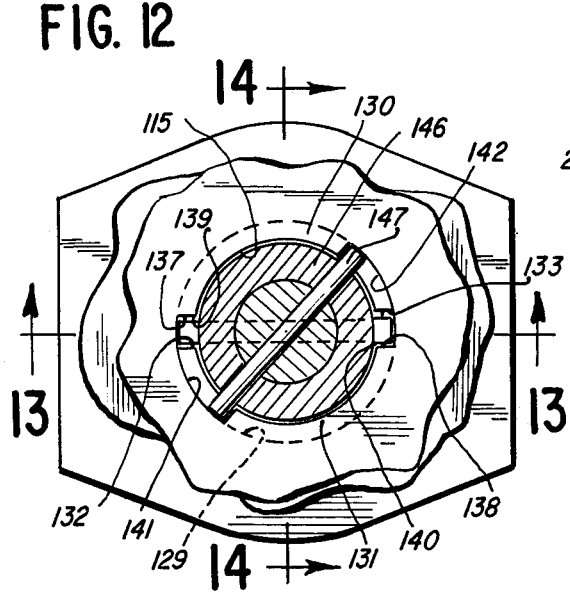
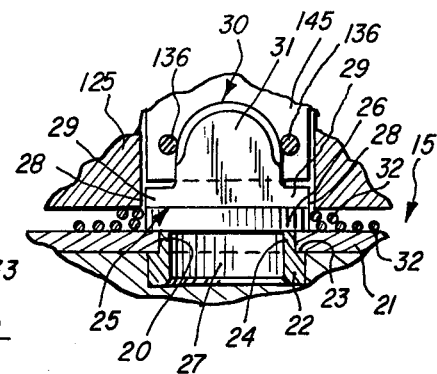
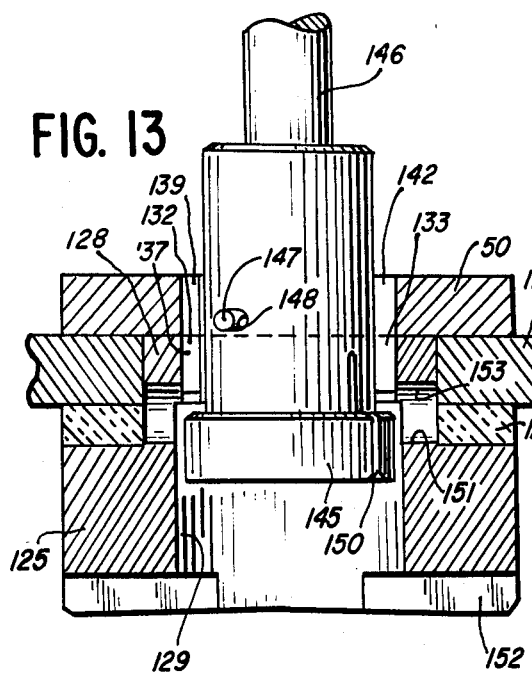
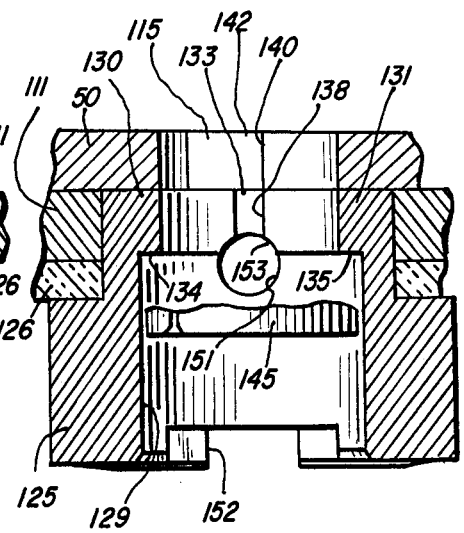

ELONGATE MATERIAL SPREADING AND TACKING APPARATUS AND METHOD

DESCRIPTION

1. Technical Field

This invention relates to tire-making apparatus and methods and, in particular, to an apparatus and method for spreading and tacking reinforcing material, such as a cable, to a tire carcass in the vicinity of an opening in the carcass.

2. Background Art

In building a closed torus tire of the type shown and described in U.S. Pat. No. 3,606,921 to Grawey and assigned to the assignee of the present application, a core of disintegratable material has one or more layers of material, such as rubber or the like, laid up to form a tire carcass tube or base. One or more openings are formed through the radially inwardly facing material of the carcass into which openings a plug or stemmed object is inserted. The plug has a flag oriented perpendicular to the parallel planes lying tangent to the sides of the carcass. Reinforcing cable is then wound on the tube of the carcass with several adjacent passes of the cable overlapping the base of the plug on each side of the flag on the plug. In the early stages of the development of the Grawey tire, after the tire was completely cable wrapped, the cables were manually spread to clear the base of the plug whereupon the cables were tacked to the carcass adjacent the plug opening. The plug was then removed.

In U.S. Pat. No. 4,102,723 to H. G. Pinkham, assigned to the assignee of the present application, a tacking strip is laid over the cables around the plug and an apparatus is placed over the plug. A turning tool on the apparatus is engaged with the flag on the plug and is turned 90° to spread the cables to a position outboard of the plug base. The apparatus is then urged toward the tire and a trigger is released whereupon the tacking strip and cable are urged against the carcass to tack the cable to the carcass adjacent the edges of the plug opening. Although the apparatus and method of the U.S. Pat. No. 4,102,723 improved the previous hand-spreading and tacking operation, it is relatively slow, requires considerable hand operation and can apply an uneven force to the tacking or stitching operation resulting in incomplete tacks or stitches.

DISCLOSURE OF INVENTION

The present invention is directed to overcoming one or more of the problems as set forth above.

According to the present invention, a tacker-spreader tool is provided and has positioning members for properly locating the tool on the carcass so that a plug-turning mandrel can engage with the plug. A pair of outboard heat transfer feet contact elongate material, such as cables, on either peripheral side of the plug to initially stake or tack said elongate material to the carcass. The plug is turned to spread the elongate material whereupon the plug-turning mandrel permits a main heat block to move into contact with the spread elongate material adjacent the plug opening to tack the elongate material to the carcass. The tool is released whereupon the heat tacking and spreading subassembly is backed away from the plug as the tool is removed from the carcass.

The heat transfer feet and main heat block may have self-contained heating elements or may be heated by a stand which is floor or wall mounted and receives the feet and block in a manner to apply heat thereto to heat them to a predetermined temperature.

BRIEF DESCRIPTION OF DRAWINGS

FIG. 3 is a top view of a heat stand for use with the spreading and tacking tool of FIG. 2;

FIG. 4 is an elevational view of the heat stand of FIG. 3 showing the spreading and tacking tool in phantom thereon;

FIG. 5 is an enlarged view of an actuating mechanism for opening and closing the jaws of the spreading and tacking tool;

FIG. 6 is an elevational view of the spreading and tacking tool in initial position on an elongate material-wrapped carcass with portions of the carcass in section and portions in phantom;

FIG. 6A is an enlarged broken out portion of the tire of FIG. 6 showing the relationship between the elongate material and the core plug;

FIG. 7 is an elevational view, similar to FIG. 6, only with the spreading portion of the tool and the core plug rotated 90° to spread the strands of elongate material and the tacking portion of the tool fully clamped on the carcass;

FIG. 7A is an enlarged, broken-away view of the core plug of FIG. 7 showing the relationship between the strands of elongate material and the plug after the plug has been rotated 90°;

FIG. 11 is a cross-sectional view taken along the line 11—11 of FIG. 10;

FIG. 12 is a top plan view with a part in cross section and other parts broken away to show the relationship of parts in two positions;

FIG. 13 is a cross-sectional view taken along the line 13—13 of FIG. 12; and

FIG. 14 is a cross-sectional view of the heat transfer block taken along the line 14—14 of FIG. 12.

BEST MODE FOR CARRYING OUT THE INVENTION

Figures 1, 2:
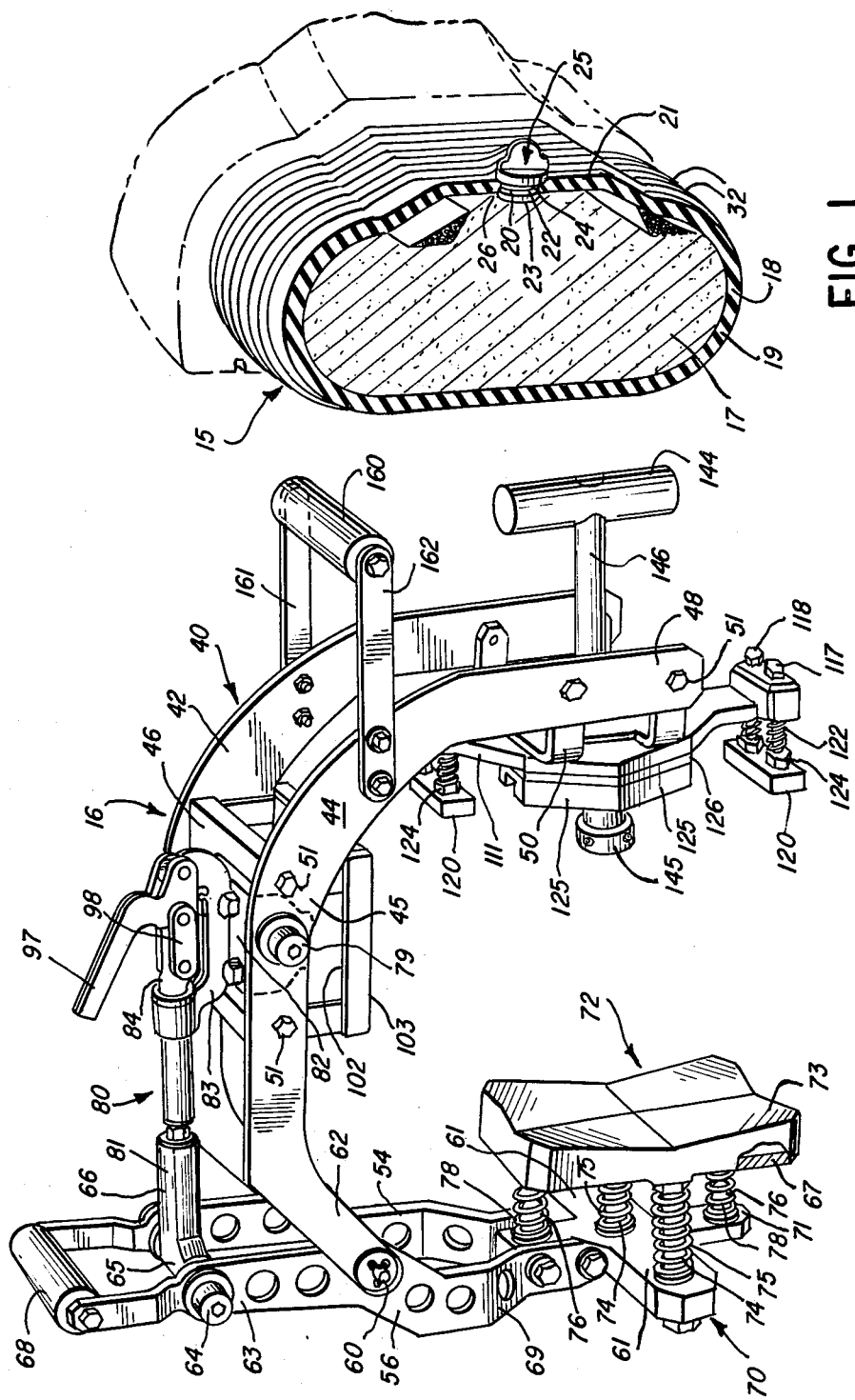
FIG. 1 is a perspective, broken away portion of a closed torus tire with various structural elements of the tire illustrated.
FIG. 2 is a perspective view of an elongate material spreading and tacking tool or jig.

Referring to FIG. 1, a broken away, cross-sectional view of a carcass 15 of a closed torus tire is illustrated in the manufacturing stage just prior to the application and use of an improved elongate material-spreading and tacking tool 16. The carcass 15 is for use in building a closed torus tire of the general type shown in the Grawey U.S. Pat. No. 3,606,921, referred to above. The carcass 15 includes a core 17 of disintegratable material to which has been applied one or two layers 18 of material, such as rubber or the like, to form the initial walls or integral tube 19 of the carcass. As shown in FIGS. 1 and 11, an opening 20 is formed through the radial inner wall 21 of the carcass 15 in which a threaded insert 22 is mounted. Two or more openings 20 may be provided without departing from the invention. A flange 23 of the insert 22 seats inside the wall 21 and a collar 24 projects radially through the opening 20.

Figure 8:
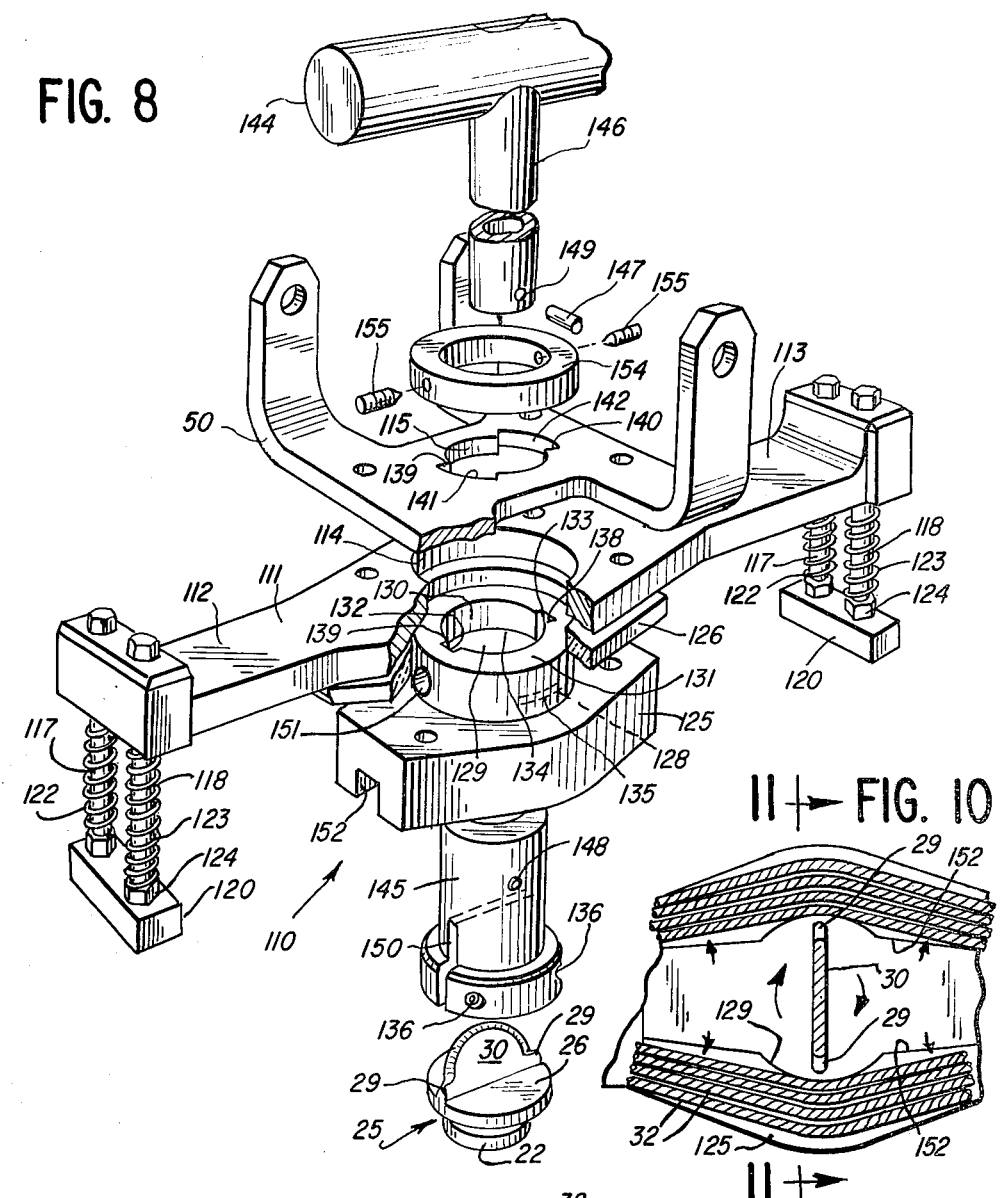
FIG. 8 is an exploded perspective view of the core plug-turning and heat-applying subassembly removed from the C-frame of the spreading and tacking tool.

As best shown in FIGS. 8 and 11, a core plug or valve plug 25 is comprised of a base wall 26 which has a protuberance 27 extending in one direction for seating in said collar 24. The base wall 26 of the plug 25 has a flag 30 extending perpendicularly from said base along a diameter of the base wall. In the illustrated form, the flag 30 has a circular portion 31 having a diameter smaller than the diameter of the base wall 26 and joins with a pair of shoulders 29 extending outwardly from the circular portion 31. The outwardly facing edges 28 of the shoulders 29 terminate in line with the radial outer face of the base wall 26 of the plug 25. The flag 30 has a triangularly-shaped edge, as shown in FIG. 7A, in the plane perpendicular to the plane of the flag 30. The core plug 25 is installed in the collar 24 of the insert 22 with the flag 30 oriented perpendicular to the sides of the carcass 15 and parallel to the direction of radially wrapped elongate material or cables 32.

Figure 9:
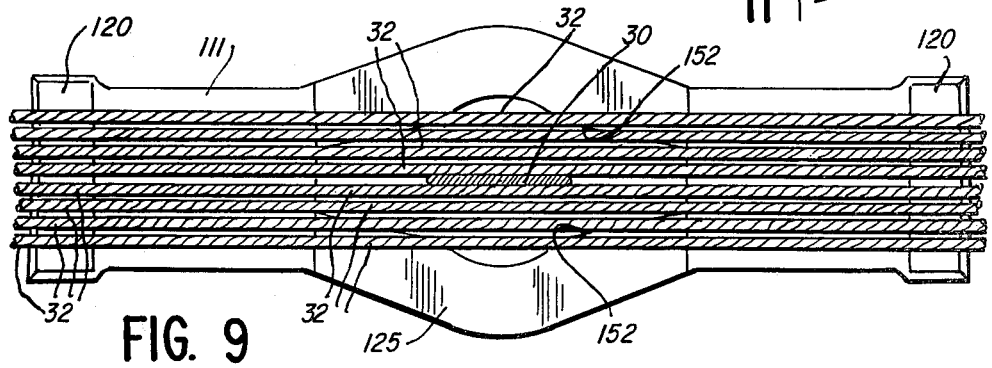
FIG. 9 is a cross-sectional view taken along the line 9—9 of FIG. 6.

The reinforcing elongate material or cable 32 is radially wrapped around the tube 19 such that several parallel strands of material or cable will be positioned on the base wall 26 of the plug 25 on either side of the circular portion 31 and shoulders 29 of the flag 30 and will lie substantially parallel to the flag 30 as is best shown in FIGS. 1, 6A and 9. The triangularly-shaped edge of the circular portion 31 of the flag 30 will guide the elongate material or cables 32 to one side or the other of the flag 30 during the laying up of the elongate material or cable on the carcass 15. As shown in FIG. 6A, the base wall 26 of the plug 25 has some vertical height, which projects upwardly from the plane of the tube 19, so that as the elongate material or cable 32 is laid up on the tube 19 and traverses up and across said base wall 26, the elongate material or cable 32 will be raised from the tube 19 a limited amount for a purpose to be described more completely hereinafter. As shown in phantom in FIG. 1, additional structural materials are added to the elongate material or cable-wrapped carcass prior to vulcanizing and completing the building of the tire. For the present purposes, the novel tool is used during the building of the tire and, in particular, at that stage in the building of the tire after the radially-wrapped elongate material or cable 32 has been laid up on the tube 19 and before the core plugs 25 are removed.

The elongate material spreading and tacking tool 16, as shown particularly in FIG. 2, is comprised of a frame 40 having a pair of arcuate-shaped members 42 and 44 which are spaced apart at an intermediate portion 45 by a mounting block 46 and at the outer end portion 48 by a four-legged bracket 50. The block 46 and bracket 50 are secured to the members 42,44 by appropriate fastening members 51. A spaced pair of actuating arms 54 and 56 are pivoted by a pin 60 to the end portions 62 of the arcuate members 42 and 44 at approximately the mid-portion of said actuating arms 54,56. One end portion 63 of each actuating arm 54 and 56 extends outwardly away from the curve of the arcuate members 42,44 and away from the pivot 60 and are joined together by pivots 64 extending into the opposite ends of the top 65 of a T-shaped housing 66. A handle 68 is pivotally mounted between the outer extremities of the end portions 63 of said arms 54 and 56.

A cruciform plate 70 has two pairs of branches 61 and 71 extending at right angles to each other with one branch of the pair of branches 71 being bolted between the inwardly extending end portions 69 of the arms 54 and 56 for supporting a positioning pad 72 thereon. The positioning pad 72 is comprised of a rigid support plate 67 and a padded cover 73, which cover 73 is shaped in two directions to seat against the torus shape of the tire carcass. The positioning pad 72 is supported on the cruciform plate 70 by three adjustable springs 75,75,75 and by two free-floating springs 78. Three aligned upwardly extending adjusting bolts 74 pass through the pair of branches 61 and through the center of the cruciform plate 70 with compression springs 75 surrounding the adjusting bolts 74 to urge the pad 72 away from the plate 70. The adjusting bolts 74 pass freely through plate 70 and are threaded into the plate 67 with a nut 77 locking the bolts 74 in the adjusted position, as shown in FIGS. 6 and 7. In the unloaded position of the pad 72, the heads of the bolts 74 bear against the undersurface of the cruciform plate 70. Two centering pins 76 extend through branches 71 and receive one end portion of springs 78 which bear against the pad 72. The ends of the pins 76 are spaced from the pad 72 so that the pad can compress the springs 78 freely. The springs 78 permit the pad 72 to adust to the shape of the carcass 15 as the compression springs 75, about the bolts 74, urge the pad 72 against the carcass.

An actuating mechanism 80, as shown in FIGS. 2 and 5, is resiliently anchored at one end in the tubular base 81 of the T-shaped housing 66 and is anchored at the other end to a block 82 pivoted by pivots 79 to the intermediate portion 45 of the arcuate members 42,44. The actuating mechanism 80 has a U-shaped bracket 83 (FIG. 5) bolted to the block 82 with a rod 84 slidably passing through one leg of said bracket 83. An adjusting bolt 85 extends through an opening 86 in a wall 87 of the T-shaped housing 66 and is threaded through a lock nut 88 and into the end of the rod 84. A compression spring 89 encircles the bolt 85 and is positioned in the base 81 of the housing 66 between the wall 87 and a washer 90 bearing against the nut 88. A head 91 is provided on the bolt 85 and is positioned against the wall 87 for adjusting the load on the spring 89. There is a space between the washer 90 and the end 92 of the base 81 of the housing 66 for adjustment of the spring loading and for initial resilient loading of the arms 54,56.

As best shown in FIG. 6, the U-shaped bracket 83 has the other leg pivotally connected by pin 94 to one leg 95 of a bellcrank lever 96 on the end of the handle 97. A link 98 is pivoted by pin 99 to the bellcrank lever 96 on the handle 97 and by pin 100 to the end of the rod 84. As the handle 97 is pivoted about pin 94 in a counterclockwise direction, the rod 84 will be extended and the spring will resiliently urge the arms 54,56 counterclockwise about the pivot 60 to move the pad 72 toward the carcass 15 located between the pad 72 and the end portions 48 of the arcuate members 42,44. When the counterclockwise force on the handle 97 and the force on the pad 72 against the carcass exceeds a predetermined amount, the spring 89 will compress until the end 92 of the housing 66 contacts the washer 90, thereafter the loading from the handle 97 to the pad 72 is direct, that is, not cushioned by the spring 89. When the handle 97 is moved to an extreme counterclockwise position, as shown in FIG. 7, a toggle action between the bellcrank 96 and link 98 takes place to lock the handle 97 down and the pad 72 fully upward against the carcass 15 as will become clear hereinafter.

As shown in FIG. 2, a plate 102 is mounted forwardly of the block 46 and has a cushioning pad 103 on the outwardly facing surface of the plate. The plane of the pad 103 is substantially perpendicular to the plane of the pad 72 when pad 72 is in the closed position. The block 46, plate 102 and pad 103 are relatively incompressible so that when the pad bears against the side wall of a carcass, it will position the pad 72 substantially in line with the midportion of the carcass 15.

As best set 50. The outer end of each arm 112,113 is enlarged and has rods 117,118 slidably passing therethrough with a rectangularly-shaped heat transfer foot 120 secured on the lower ends of said rods 117,118. Compression springs 122 and 123 encircle the slidable rods 117,118 so as to resist movement of the heat transfer feet 120 toward the end portions of the anvil 111. The loading of the spring 122,123 can be accomplished by threading the rods 117,118 through the lock nuts 124 and into the feet 120. An enlarged heat transfer block 125 is bolted to the anvil 111 and to the bracket 50 from below and has a sheet of insulation material 126 sandwiched between the block 125 and the anvil 111. The heat transfer block 125 has a protruding cylindrically-shaped boss 128 integrally formed therewith and extending into the aperture 114 in the anvil 111. As shown in FIGS. 13,14, the boss 128 and the block 125 have an opening 129 extending therethrough with a pair of semi-cylindrically-shaped segments 130, 131 projecting inwardly from the boss 128 to form a pair of diametrically facing slots 132,133 and a pair of downwardly facing shoulders 134,135. One wall 137,138 of each slot 132,133 align with one wall 139,140 of the wings 141,142 of the butterfly opening 115 so that the slots 132,133 are aligned with the diametrically opposite end portions of the wings 141,142 of the opening 115.

A plug-engaging member 145 is slidably received in the opening 129 in the heat transfer block 125 and is connected to a lower end of a shaft 146 on a handle 144 by a dowel pin 147 passing through aligned openings 148,149, respectively, in the block 125 and the shaft 146 with the dowel pin 147 extending radially outward from both sides of the block 125. The extended ends of the dowel pin 147 align with the slots 132,133 in the boss 128 on the block 125 and with the butterfly opening 115 in the bracket 50 so as to permit the pin 147 and the attached block 125 to be moved upwardly and downwardly therethrough. An aligned pair of openings 151, FIG. 14, are bored through the walls of the block 125 in slight overlapping relation to the slots 132,133 to provide guide surfaces 153 into the slots. The pin 147 will move along the surfaces 153 and be guided into the slots 132,133. It should be noted that sections of the wings 141,142 of the butterfly opening 115 overlap the segments 130,131 so that after the pin 147 has been raised through the slots 132,133 in the block 125, the handle 144 can be turned counterclockwise to rest the pin 147 on the segments 130,131 to retain the plug-engaging member 145 retracted in the block 125. The plug-engaging member 145 has a slot 150 in the downwardly facing surface thereof for receiving the flag 30 on the core plug 25. FIGS. 8 and 11 show roll pins 136 intersecting the slot 150 to act as guides for guiding the plug-engaging member 145 into alignment with the flag 30 on the plug 25. The axis of the sides of the slot 150 and the axis of the handle 144 on the shaft 146 are parallel so that the orientation of the handle 144 reveals the orientation of the slot 150. The axis of the pin 147 is perpendicular to the axis of the handle 144 and slot 150 and is maneuvered accordingly with respect to the handle. It is to be understood that, as a modification, a key, not shown, could extend down from the surface of the member 145, which could engage in a slot, not shown, in the base 26 of the plug 25. The key on the member 145 will serve to spread the cables 32 when the member 145 is turned.

Figure 10:
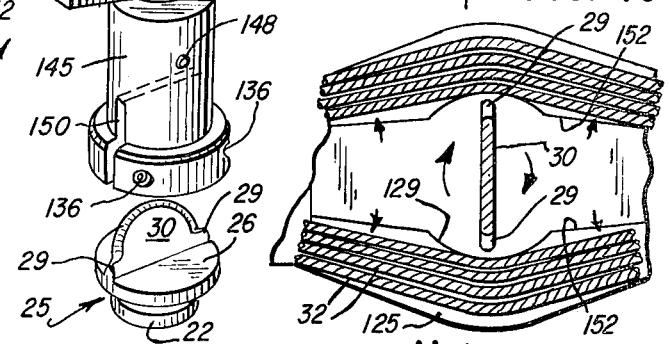
FIG. 10 is a cross-sectional view taken along the line 10—10 of FIG. 7.

The heat transfer block 125 has a groove 152 cut in the downwardly facing surface thereof, which groove, as shown in FIG. 10, enlarges in the midportion to a width approaching the diameter of the opening 129 in the midportion of the block 125. A collar 154 is secured to the shaft 146 of the handle by diametrically inwardly extending set screws 155. The collar 154 is positioned on the shaft 146 at a location to permit the plug-engaging member 145 to project beyond the plane of the heat transfer feet 120 so that the slot 150 in the member 145 can be aligned with and initially engaged on the flag 30 of the plug 25 before the heat transfer feet 120 engage with the carcass 15.

Although it is understood that the two heat-applying feet 120 and the heat block 125 could have self-contained heating elements, heating of the blocks can also take place from an external source. In FIGS. 3 and 4, a heat stand 169 is illustrated and has a base plate 170 which, in this case, is mounted on a floor with an upstanding pair of supports 172 and 174. A deck 175 is mounted on the supports 172,174 and is suspended in an outwardly extending manner by angle brackets 177. A receptacle 178 is mounted on the deck 175 and encloses a heat-generating element 180 connected to a control unit 182 mounted on the supports 172,174. The unit 182 is a commercially available control for heating and maintaining the element 180 at a preselected temperature. The unit 182 includes a dial for setting the desired temperature and a light for indicating that the desired temperature has been reached. The element 180 is comprised of four shaped blocks 184 which define a cavity 185 for receiving the heat transfer feet 120,120 and the heat transfer block 125. A heat plate 187 is disposed at the base of the cavity 185 so that the faces of the feet 120 and block 125 will bear thereon to receive heat from the plate 187 until the preselected temperature is obtained. The tool 16, with the handle 97 of the actuating mechanism 80 in the vertical position so as to open the jaws of the C-frame to the fullest, is lifted by handle 160 and steadied by the handle 68 and is placed on the heat stand 169 by aligning and nesting the feet 120,120 and block 125 in the cavity 185 in the element 180 and permitting the rest of the tool 16 to hang from the deck 175. The tool 16 is balanced so as to assume the dotted line position of FIG. 4. The heating element 180 operating through the control 182 will raise the temperature of the feet 120 and block 125 to the desired preselected temperature ready for use.

A second lifting handle 160 is connected by straps 161,162 to the arcuate-shaped members 42 and 44 with the handle being aligned with the vertical center of gravity of the tool 16 when the tool is in a position with the actuating mechanism 80 lying substantially vertical. The lifting handle 160 is positioned with respect to one center of gravity, such tht during placing of the tool 16 on the heat stand, the tool is not trying to rotate off the stand. To remove the tool from the heat stand and to rotate the tool for application to the carcass, the handles 160 and 68 are used. The handle 68 and the handle 160 are balanced along a center of gravity perpendicular to the previously identified center of gravity such that the space between the pad 72 and the heat-applying subassembly 110 opens downwardly. The pad 103 is positioned on the side wall of the carcass 15 as the slot 150 in the member 145 is aligned with and is moved into initial contact with the flag 30 on the plug 25, whereupon the tool 16 is manipulated for initial tacking of the elongate material or cable by the feet 120, the plug is turned by handle 144 to spread the elongate material or cables, and the spread elongate material or cables are finally tacked to the carcass by block 125. With the handles so positioned, the tool is always balanced for either application of the tool 16 on the heat stand 169, or for application of the tool 16 to the carcass 15 for tacking the elongate material or cables 32 to the carcass 15.

Industrial Applicability

In one stage of the manufacture of a torus tire, the carcass 15 contains the core 17 and layers 18 of material forming a tube 19 on the core with at least one threaded insert 22 and core plug 25 projecting from the inner periphery of the carcass 15. The flag 30 on the plug 25 is oriented perpendicular to the sides of the carcass with a continuous radially wrapped elongate material or cable 32 around the tube 19 and having several strands of the elongate material or cable 32 overlapping the base 26 of the plug 25. The carcass 15 of the torus tire is positioned on one side with the plane of the carcass extending horizontally and with the core plug 25 projecting radially inward toward the center of the carcass. The tool 16 is lifted from the heat stand 169 by one hand on the handle 160 and the other hand on handle 144 and rotating the handle 144 to align the pin 147 with the slots 132,133 in the block 125 whereupon the handle 144 and plug-engaging member 145 are moved to extend the member 145 beyond the plane of the block 125 with the slot 150 in the member 145 lying in a plane containing the centers of the feet 120,120 and the centerline of the block 125. The hand used to turn handle 144 is now placed on handle 68 and the tool is rotated 90° so that the opening between pad 72 and the heat-applying subassembly 110 faces downward. The opening between pad 72 and subassembly 110 is aligned with the carcass 15 in the vicinity of the core plug 25 and is lowered over the carcass until the pad 103 engages the side wall of the carcass. The tool is shifted horizontally slightly to engage the flag 30 on the plug 25 in the slot 150 in the member 145. The hand on handle 68 releases handle 68 and grasps the handle 97 to rotate handle 97 counterclockwise so as to move the pad 72 against the outside circumference of the carcass 15 (see FIG. 6). The continued movement of the handle 97 will shift the tool 16 on the carcass until the heat transfer feet 120,120 contact the elongate material or cables 32 and tack the elongate material or cables on the peripheral sides of the plug 25. At this point, the washer 90 on the actuating mechanism 80 will just be engaging with the end 92 of the housing 66 so that the pressure applied by the heat transfer feet 120,120 to the elongate material or cables against the carcass will be a predetermined amount. This will tack the elongate material or cables 32 peripherally outward from the valve plug 25.

The handle 144 is now rotated 90° which will rotate the flag 30, shoulders 29 and plug 25 relative to the strands of elongate material or cable 32, with the shoulders 29 gradually spreading the elongate material or cables 32 and forcing them off the outer edge of the base 26 of the plug 25 in a circumferential direction with respect to the carcass and as is shown in FIGS. 7A and 11. The extra length of elongate material or cable needed to spread the elongate material or cables the required amount comes from the elongate material or cables being extended over the base 26 of the plug 25 as is shown in FIG. 6A. The handle 97 of the actuating mechanism 80 is now pushed all the way to the fully clamped position so as to fully lock the tool on the carcass. This will move the main heat transfer block 125 against the elongate material or cables 32 stacked adjacent to the base 26 of the core plug 25 and will tack said elongate material or cables to the resilient material on the circumferential sides of the opening 20. The heat from the heat transfer feet 120,120 and from the main heat transfer block 125 will not only tack the elongate material or cables 32 to the tube 19, but will partially cure the material to better hold the elongate material or cables in position. The handle 97 of the actuating mechanism 80 is now pivoted to release the pad 72 from the tire carcass whereupon the tool 16 can be shifted horizontally relative to the carcass so as to move the turning and stacking subassembly 110 from the carcass. The plug 25 may or may not be removed with the subassembly 110. The tool is then moved vertically away from the carcass whereupon if the core plug 25 is retained in the member 145, it is knocked loose from the member 145. The carcass is then rotated to align the next core plug 25 with the tacking station and the process is repeated. Generally, there is sufficient heat in the heat transfer feet 120,120 and block 125 to permit tacking the elongate material or cable around two openings. After the elongate material or cable has been tacked, the frame is opened and the heat transfer feet 120,120 and block 25 are aligned with the put down into the cavity 185 of the heating element 180 of the heat stand 169 so as to reheat the heat transfer feet 120,120 and block 125 to the desired temperature.

I claim:

1. An apparatus for tacking strands of elongate material (32) to a tire carcass (15) having a core opening (20) therein comprising a frame (40), actuating means (80) on said frame (40) for clamping said frame (40) on said carcass (15), first means (120,120) carried by said frame (40) for initially tacking said elongate material (32) on peripheral sides of said core opening (20), means (145) on said frame for spreading strands of elongate material (32) overlying said core opening (20) to circumferential sides of said core opening, second means (125) on said frame (40) for tacking said spread elongate material (32) circumferentially of said core opening (20), said actuating means (80) being actuated to partially close said frame (40) about the carcass (15) and to move said first means (120,120) against said elongate material (32) to tack said elongate material to the peripheral sides of said core opening (20), and said actuating means (80) being further actuated to clamp said frame (40) on said carcass (15) with the second means (125) tacking said elongate material (32) to said carcass (15) on circumferential sides of said core opening (20).

2. An apparatus as claimed in claim 1 wherein means (72,102) are provided on said frame (40) for centering said frame on said carcass (15) relative to said core opening (20).

3. An apparatus as claimed in claim 1 wherein said means (145) is a member having a slot (150) for receiving a flag (30) on a plug (25) located in said core opening (20), and wherein said member (145) is turned to turn the plug (25) to spread the strands of elongate material (32) overlying said plug (25).

4. An apparatus as claimed in claim 1 wherein means (187) are provided for maintaining a predetermined level of heat in said first (120,120) and second (125) tacking means.

5. An apparatus as claimed in claim 1 wherein a heat apparatus (169) is provided with a heating element (180) onto which the first (120,120) and second (125) tacking means are positioned to raise and maintain a predetermined level of heat therein.

6. An apparatus as claimed in claim 1 wherein said first means (120) is a heat transfer foot (120) and said second means is a heat transfer block (125), said heat transfer foot (120) being spaced from said heat transfer block (125) and extending forward of the plane of said block (125) in the inactive position of the frame (40) so as to contact the elongate material (32) before the block (125) contacts the elongate material.

7. An apparatus as claimed in claim 1 wherein said actuating means (80) has a toggle link (98) connected to a bellcrank lever (96) to give a toggle action to apply a predetermined pressure to the carcass (15) when the actuating means (80) is fully activated.

8. An apparatus as claimed in claim 1 wherein said first means (120) is suspended from an anvil (111) on one side of said second means (125), and wherein said means (145) for spreading strands of the elongate material (32) is slidable in said second means (125) and includes a member (145) having a slot (150) for receiving a flag (30) on a plug (25) mounted in said core opening (20), a handle pinned to said member (145) by a pin (147) extending radially outwardly beyond the sides of said member (145), a pair of slots (132,133) in said second means (125) through which said radially extending pin (147) can pass as said member (145) is axially moved into position to contact said plug (25), said pin (147) clearing said slots (132,133) so that said member (145) can be rotated to align the slot (150) with the flag (30) on the plug (25) and so that the member (145) and plug (25) can be rotated to spread the strands of elongate material (32) overlying the plug (25).

9. An elongate material tacking tool (16) having a frame (40), actuating means (80) on said frame (40) for manipulating the opening in said frame, contact pads (72,102) located on the frame (40) and on one edge of the opening of the frame for contacting a workpiece at two areas 90° apart, heat-tacking members (120,120,125) carried by the other edge of the opening of the frame (40) with at least one of said tacking members being an initial tacking member (120) and being spaced on one side of a final tacking member (125), spreading means centered in said final tacking member (125) and being turnable in the plane of said final tacking member, said actuating means (80) being actuated to partially close the opening in said frame (40) to move said initial tacking member (120) into contact with parts on the workpiece to tack a portion of said parts to the workpiece, said spreading means being turned to spread portions of said parts on the workpiece spaced from said first-named portions, said actuating means (80) being further actuated to finally clamp said frame (40) on said workpiece with the final tacking member (125) in contact with said spread portions of the parts on said workpiece to tack said spread portions to the workpiece.

10. A cable-tacking tool (16) as claimed in claim 9 wherein said workpiece is a tire carcass (15) and said parts on the workpiece are cables (32).

11. An apparatus (16) for tacking strands of cable (32) to a tire carcass (15) having a core opening (20) across which said strands of cable lie, comprising a frame (40), actuating means (80) on said frame (40) for enlarging and closing the opening into said frame (40), first means (120) carried by said frame (40) for initially tacking said cable (32) on peripheral sides of said core opening (20), second means (125) on said frame (40) for tacking said cable (32) circumferentially of said core opening (20), means (145) on said second means (125) for spreading the strands of cable (32) overlying said core opening (20), said actuating means (80) being actuated to partially close said frame (40) about the carcass (15) and to move said first means (120) against said cables (32) to tack said cables (32) to the peripheral sides of said core opening (20), said means (145) being turned to spread the cables (32) lying across the core opening (20), said actuating means (80) being further actuated to clamp said frame (40) on said carcass (15) with the second means (125) tacking said cables (32) to said carcass (15) on the circumferential sides of said core opening (20).

12. An apparatus (16) as claimed in claim 11 wherein means (72,102) are provided on the frame (40) for positioning said frame on said carcass (15) with the means (145) aligned with said core opening (20).

13. An apparatus (16) for tacking strands of cable (32) to a tire carcass (15) having a core opening (20) in which a core plug (25) is seated, strands of cable overlying said core plug (25), said apparatus comprising a frame (40), actuating means (80) on said frame for manipulating the size of the opening into said frame (40), first means (120,120) carried by said frame (40) for initially tacking said cable (32) to the carcass (15) on peripheral sides of said core opening (20), second means (125) on said frame (40) for tacking said cable (32) circumferentially of said core opening (20), turning means (145) on said second means (125) engaging with said plug (25) for turning said plug (25) and spreading adjacent strands of cable (32) to a position on the circumferential sides of said core opening (20), said actuating means (80) being actuated to partially close said frame (40) about the carcass (15) and to move said first means (120,120) against said cables (32) to tack said cables (32) to the peripheral sides of said core opening (20), said turning means (145) being turned to rotate the plug (25) and to spread the cables (32) lying across said plug (25), said actuating means (80) being further actuated to clamp said frame (40) on said carcass (15) with the second means (125) tacking said cables (32) to said carcass (15) on circumferential sides of said core opening (20).

14. An apparatus (16) as claimed in claim 13 wherein means (72,102) are provided for centering the frame (40) on said carcass (15) with said turning means (145) generally aligned with said plug (25).

15. A method of tacking a plurality of strands of elongate material (32) to a tire carcass (15) around a core opening (20) in said carcass (15), applying heat to said elongate material (32) and carcass (15) on either peripheral side of said core opening (20) to initially tack said elongate material (32) to said carcass (15), spreading the elongate material (32) lying over said core opening (20), and applying heat to said elongate material (32) and carcass (15) circumferentially adjacent said core opening (20) to tack said spread elongate material (32) to said carcass (15).

16. A method of tacking a plurality of strands of cable (32) to a tire carcass (15) having a core plug (25) in a core opening (20) and having a plurality of strands of cable (32) overlying the base (26) of said plug (25), placing a tool (16) over the carcass (15) and aligning a member (145) with said plug (25), engaging said member (145) with said plug (25), moving a portion of said tool (16) relative to said carcass (15) to heat tack (125) strands of cable (32) to said carcass (15) on peripheral sides of said core opening (20), moving said member (145) to spread the strands of cable (32) overlying the base (26) of said plug (25), and further moving said tool (16) relative to said carcass (15) to heat tack (125) the spread strands of cable (32) to the carcass (15) on circumferential sides of said core opening (20).

17. A method as claimed in claim 16 wherein said spreading is accomplished by turning said member (145) to turn said plug (25).

18. A method as claimed in claim 16 wherein said member (145) has a recess (150) for receiving a flag (30) on said plug (25) and wherein turning said member (145) turns said plug (25) and said flag (30) spreads said cables (32).

19. A cable-tacking tool (16) for tacking cable (32) to a carcass (15) of a tire in the vicinity of a core opening (20) into the carcass (15), said tool (16) having a frame (40), actuating means (80) on said frame (40) for manipulating the opening in said frame (40), means (72,102) on the frame (40) and on one edge of the opening of the frame for contacting the carcass (15) at two spaced points, heat-tacking members (120,120,125) carried by the frame (40) at least one of said heat-tacking members being an initial tacking member (120) and being spaced on a peripheral side of a final tacking member (125), at least one other of said heat tacking members (125) being a final tacking member, means (145) centered on said final tacking member (125) for spreading the cables (32) overlying the core opening (20), said actuating means (80) being actuated to partially close the opening in said frame (40) with said initial tacking member (120) heat tacking cables (32) to the carcass (15) on at least one peripheral side of said core opening (20), said means (145) on said final tacking member (125) being turned to spread the cables (32) lying across said core opening (20), said actuating means (80) being further actuated to finally clamp said frame (40) on said carcass (15) with the final tacking member (125) heat tacking said cables (32) to said carcass (15) on the circumferential sides of said core opening (20), and said actuating means (80) being released to remove the frame (40) from the carcass (15).

* * * * *